(12) United States Patent
Frew et al.

(10) Patent No.: US 7,630,518 B2
(45) Date of Patent: Dec. 8, 2009

(54) IMAGE PROCESSING SYSTEM

(75) Inventors: David Todd Frew, Fort Mill, SC (US);
Matthew A. Calman, Waxhaw, NC (US); Mark David Felse, Charlotte, NC (US); Kerry Cantley, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 311 days.

(21) Appl. No.: 11/161,475

(22) Filed: Aug. 4, 2005

(65) Prior Publication Data
US 2007/0031022 A1 Feb. 8, 2007

(51) Int. Cl.
*G06K 9/00* (2006.01)
(52) U.S. Cl. .................................. 382/112
(58) Field of Classification Search ............... None
See application file for complete search history.

(56) References Cited

U.S. PATENT DOCUMENTS

| | | | | |
|---|---|---|---|---|
| 5,532,464 | A * | 7/1996 | Josephson et al. | 235/379 |
| 5,687,250 | A * | 11/1997 | Curley et al. | 382/112 |
| 7,062,463 | B2 * | 6/2006 | Knapp | 705/39 |
| 7,283,656 | B2 * | 10/2007 | Blake et al. | 382/137 |
| 2002/0152164 | A1 * | 10/2002 | Dutta et al. | 705/43 |
| 2003/0151755 | A1 * | 8/2003 | Nishio et al. | 358/1.9 |
| 2004/0109596 | A1 * | 6/2004 | Doran | 382/137 |
| 2005/0071283 | A1 * | 3/2005 | Randle et al. | 705/75 |
| 2005/0097046 | A1 * | 5/2005 | Singfield | 705/42 |
| 2005/0171899 | A1 * | 8/2005 | Dunn et al. | 705/39 |
| 2005/0213805 | A1 * | 9/2005 | Blake et al. | 382/137 |
| 2005/0220324 | A1 * | 10/2005 | Klein et al. | 382/112 |
| 2009/0024520 | A1 * | 1/2009 | Drory et al. | 705/40 |

OTHER PUBLICATIONS

International Preliminary Report on Patentability from PCT/US2006/030422, dated Feb. 14, 2008.
International Search Report dated Oct. 22, 2007.

* cited by examiner

*Primary Examiner*—Matthew C Bella
*Assistant Examiner*—Alex Liew
(74) *Attorney, Agent, or Firm*—Michael A. Springs; Moore & Van Allen PLLC

(57) ABSTRACT

An image processing system requires that both a data file and an image file are received before the item is sent to a posting system. When a data file including an image is received, the system determines if the image was properly and timely received. If the file was properly received, the file is interpreted to ascertain whether the image has been previously tested and passed image quality analysis or if it requires testing by the receiving institution. If testing is required the image is sent through image quality analysis (IQA) to determine if the image meets an acceptable quality standard. If the image passes IQA, it is passed to the institution's posting process. If the image does not pass IQA and the failure is not overridden, the item is returned to the presenting institution. The system prevents the posting of the transaction and corresponding image until a quality image is received and approved.

21 Claims, 2 Drawing Sheets

IMAGE PROCESSING SYSTEM

BACKGROUND

The invention relates generally to an electronic document handling system and more particularly to an improved image processing system.

It will be appreciated that millions of checks, both commercial and retail, are presented to financial institutions for processing every day. Each of these checks must be processed by one or more institutions and by the account holder's bank. Because of the volume of checks handled every day, the processing of checks is typically automated where high speed equipment automatically read, sort and process the checks based on the MICR (magnetic ink character recognition) code printed on the bottom of the checks.

Posting is the process by which an institution settles a transaction on an account, records the transaction and makes available a copy of the transaction instrument to the account holder. For one typical type of account the transaction instrument is made available to the account holder via a monthly statement.

A process known as Electronic Check Presentment ("ECP") was developed in the 1980's and 1990's and implemented by some financial institutions to send and receive MICR code of a check for posting to a customer's account in advance of the actual physical check. This process accelerates the posting process and availability of funds, with the drawback of reconciling differences between MICR code transmissions and subsequent physical check arrival, sometimes resulting in financial adjustments to customer accounts. Banks work to avoid these adjustments, since unexpected changes in account balances are disruptive and dissatisfying to customers.

The Check Clearing for the $21^{st}$ Century Act (Check 21), intended to modernize the nation's check collection and forwarding process and minimize its disruption by eliminating reliance on paper-processing and physical transport. Check 21 allows financial institutions to generate substitute checks, or image replacement documents (IRD's), with the same legal status as an original check. Images can be sent between financial institutions and, by the nature of reconversion from image back to substitute checks, can be negotiated the same as the original paper document.

Any time an electronic image of a check is created the image may not be of suitable quality for posting. Factors contributing to poor quality include the source document, ink color, defects in the image capture process, and so on. Moreover the Financial Services Technology Consortium is developing industry standards for image quality and usability that must be met by the transferred images. If an image of poor quality, or an item missing an image altogether, is posted to an account, the posting institution may be liable for a wrongful payment and/or the customer may not be able to prove payment. Under practices set forth in partner bank agreements and established industry rule sets for check image exchange, an acceptable quality image, faithful to the original check, is required for presentment for payment to be considered to have occurred. Under practices set forth in partner bank agreements and established industry rule sets for check image exchange, an acceptable quality image, faithful to the original check is required for presentment for payment to be considered to have occurred. Moreover, where a customer discovers a posting problem the bank must engage in customer reversal and reclamation processes for funds that were erroneously settled. Moreover, banking customers expect that any image posted to their account faithfully represents the check as written. Low quality postings and reversals are visible to the institution's customers and may be viewed by the customer as mistakes by the institution resulting in customer dissatisfaction. This problem is exacerbated where the incorrect posting of the check occurs near the end of a transaction reporting cycle and the reversal is not reported until the following statement, perhaps one month later.

Thus, an improved image posting process that monitors image quality and that accelerates image defect returns to the presenting institution and prevents defective check image transactions from being posted is desired.

SUMMARY

The image posting system comprises a process for requiring that both the data related to the check and the check image be received and the image quality approved as meeting minimum standards before the item is sent to the institution's posting system and funds debited from a customer account. When a data file including an image is received, the system determines if the image was properly and timely received. If the file was properly received, the image is sent through image quality analysis (IQA) to determine if the image meets an acceptable quality standard. If the image passes IQA, it is passed to the institution's posting process. If the image does not pass IQA, the item is returned to the sending institution. The term "return" as used herein is intended to broadly encompass any financial institution process where the image quality failure results in remedial action by the financial institution and includes returns and adjustments as are known in the banking industry. The system prevents the posting of the transaction and corresponding image until a quality image is received and approved.

DETAILED DESCRIPTION OF THE PREFERRED EMBODIMENTS OF THE INVENTION

The present invention will now be described in terms of specific example embodiments. It is to be understood that the invention is not limited to the example embodiments disclosed. It should also be understood that not every feature of the methods and systems described is necessary to implement the invention as claimed in any one of the appended claims. Also, throughout this disclosure, where a process or method is shown or described, the steps of the method may be performed in any order or simultaneously, unless it is clear from the context that one step depends on another being performed first. Additionally, there can be significant time lag between steps.

The terms "bank," "financial institution," and "institution" are used herein in their broadest sense. Institutions, organizations, or even individuals that process image documents are widely varied in their organization and structure. Terms like bank and institution are intended to encompass all such possibilities, including but not limited to, finance companies, stock brokerages, credit unions, mortgage companies, merchants, finance companies, the Federal Reserve Bank or other government entities etc. These illustrations are examples only, and an institution or business can implement the entire invention on their own computer systems or even a single work station if appropriate databases are present and can be accessed.

Figure 1:
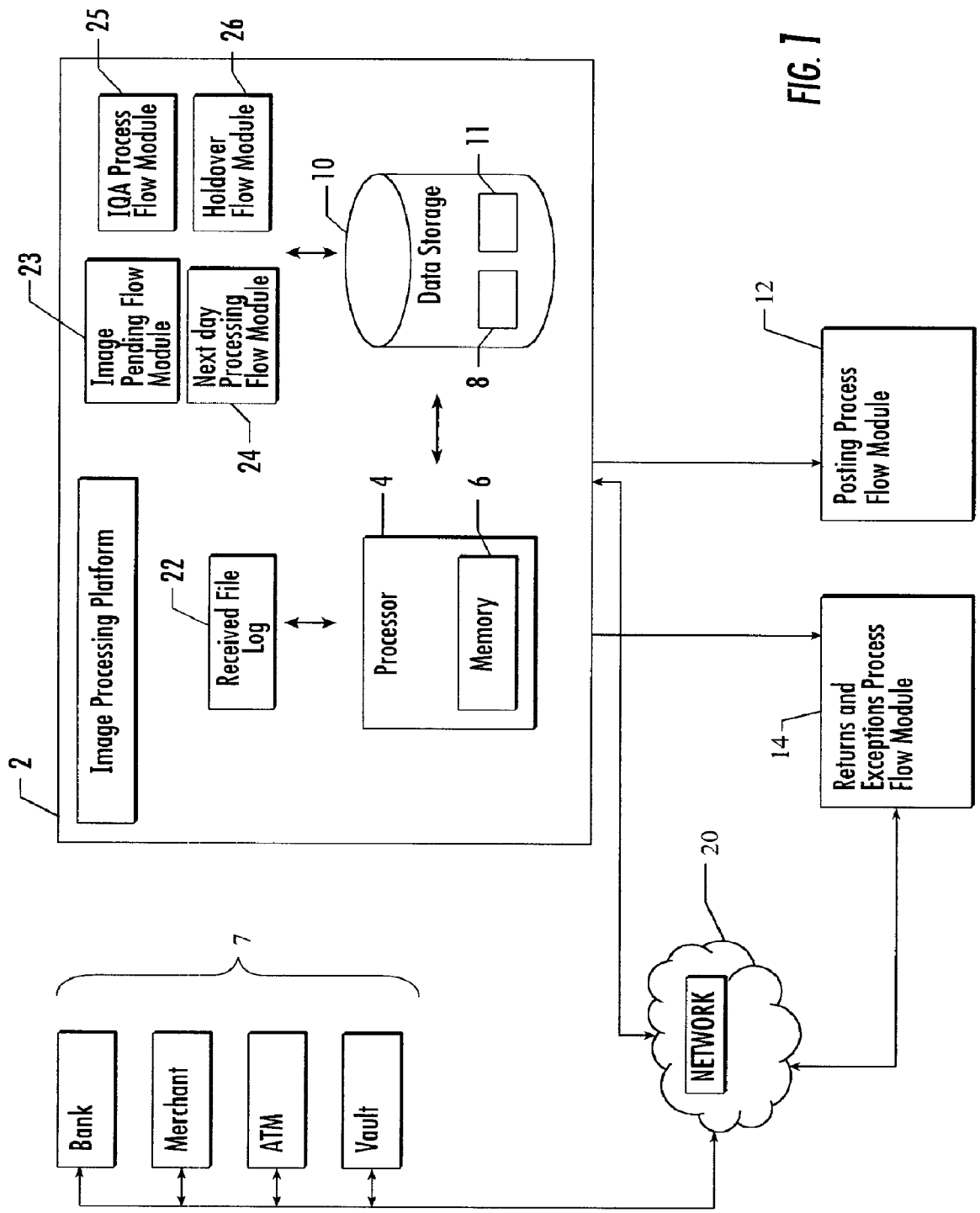
FIG. 1 is a block diagram showing one operating environment for the system of the invention.

FIG. 1 is a block diagram illustrating one example operating environment for the present invention. Image processing platform 2 can include one or more processors 4 and a certain amount of memory 6. Such a processing platform has associated with it data storage 10 such as optical disks, magnetic discs, tape or other storage device for storing the data files shown generally at 8, and computer programs or computer program code as shown at 11. Image processing platform 2 may reside at the financial institution or with a contractor. In the example of FIG. 1, image processing platform 2 and the affiliated storage and computer program code and data storage elements are used to process image files received from presenting institutions 7 such as banks, merchants, ATM's, vaults, individuals government entities or other institutions. The term "presenting institution" is used herein is intended to encompass any input channel to the institution's image processing platform. Communication can take place over network 20, which may be via virtual private networking (VPN) or other encrypted connections over the Internet, or via private networking facilities. The image processing platform 2 sends approved files to the institution's posting process flow module 12 where the transaction is posted to a customer's account. The image processing platform 2 may also send unacceptable files to the institution's returns and exceptions process flow module 14 where the item may be returned to the presenting institution.

As previously discussed, it should be noted that computer program code in the form of various computer program instructions can be used to implement at least portions of the processes involved in carrying out embodiments of the invention. Such computer program code can be supplied via a computer program product containing all or a portion of the computer program instructions stored on a media. The media may be fixed, or removable. Such a media is conceptually illustrated at 11 of FIG. 1 as a fixed storage media, but it could also be a removable optical or magnetic disc or tape. The computer program instructions can reside on any medium that can contain, store, communicate, propagate, or transport computer program code for execution by any type of computing platform, instruction execution system, or collection of such systems interconnected via a bus or network. Such a computer readable medium may be, for example, but not limited to, an electronic, magnetic, optical, electromagnetic, infrared, or semiconductor system, device, or propagation medium. Other examples of the computer-readable medium would include an electrical connection having one or more wires, a portable computer diskette or portable fixed disk, an optical fiber, a compact disc read-only memory (CD-ROM), and a digital versatile disc read-only memory (DVD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. Computer program instructions which implement all or a portion of the invention may also be embodied in a stream of information being retrieved over a network such as the Internet. All of the computer program code involved in carrying out the processes described herein can reside with one party, or on a single system. This would be the case, for example, if a financial institution wished to have complete control of the process.

The term "module" is meant to refer to a specific process that is performed as part of the electronic image processing system discussed throughout. Often a module corresponds to a software application.

Figure 2:
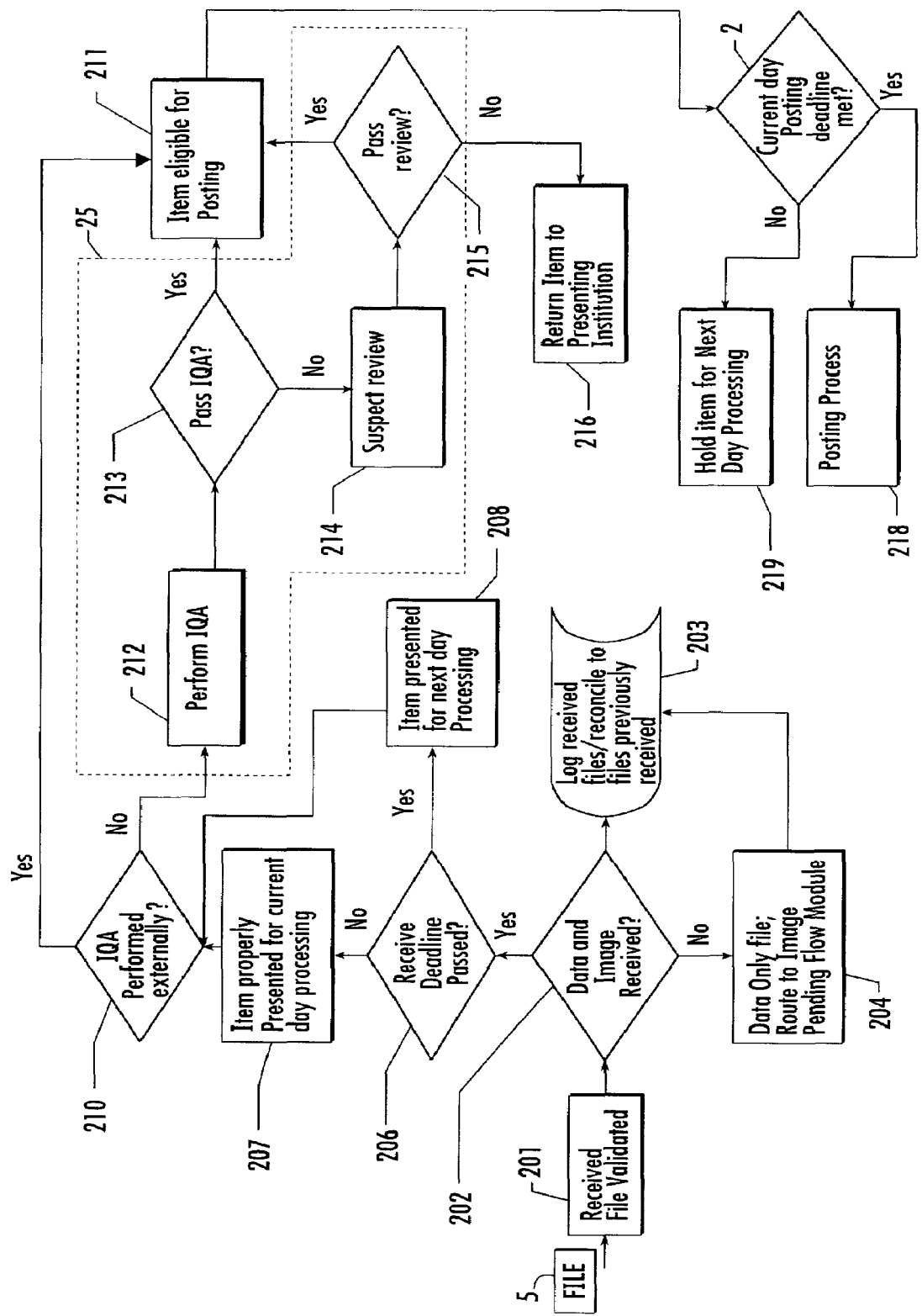
FIG. 2 is a flow chart showing the operational steps of the system of the invention.

The image processing system of the invention will be described with reference to FIGS. 1 and 2. A file 5 in a standard format (such as ASC X9.37-DSTU-2003, ASC X9.100-180 or other accepted industry format) is received from a presenting institution 7 into the Image processing platform 2 (block 201). The format of the file is an ASC ANSI standard such that it can be handled by any standard compliant financial institution. Current standard file formats include an ECP file that contains only data and is sent in advance of an ECPi file that contains associated images with the data or an ICL file that contains both data and image in a single file. While specific standardized file types have been described, the invention may be used with any file type having an image. The received files are authenticated and validated by an authentication module to ensure that they are properly formatted and received at the proper institution.

A determination is made as to whether the file contains an image (block 202). This is determined by the file type, its image field size in bytes, and certain tags and flags within the file as specified by partner bank agreements. All files received at the receiving institution, whether containing an image or not, are logged into a received file log 22 that identifies the file, file type and any other pertinent information as decided upon by the institution (block 203). If the file contains an image, for example, an ECPi or ICL file, the image and data are eligible for further processing. Received files that contain only data where the image is to follow in a separate file are routed to an "image pending" flow module 23 where the receipt of the data-only file is acknowledged but the file is not allowed to go to further processing without the image (block 204). For ECP files a matching ECPi file with image is expected to be received and matched to the corresponding ECP file previously logged into the received file log 22 (block 203).

For files with an image, a decision is made whether the deadline for processing the file in the current business day is determined (block 206). This determination is based on trading partner agreements with the sending institutions. Each receiving institution may have different agreement terms with the presenting institution that define the criteria for when an item is considered timely received. If the received file meets the criteria for a "current day" transaction the file is passed for "current day" processing (block 207). If the file does not meet the criteria for a current day transaction as defined in the controlling trading partner agreement, the file is passed to the "next day" processing flow module (block 208).

For "current day" files a determination is made whether or not the file must be presented to the institution's IQA (Image Quality Analysis) process flow module 25 (block 208). For some exchange partner institutions and for some exchange channels the IQA will be completed as part of the sending institution's core process under an agreement with the receiving institution. If IQA is performed by the sending institution and the corresponding test results are properly represented in the file format IQA does not need to be performed again by the receiving institution. Thus, if IQA has been performed externally and the incorporated test results are acceptable (block 210) the file is eligible to be passed to the receiving institution's posting process flow module 12. If IQA has not been performed externally (block 210), the file is passed to the receiving institutions IQA process flow module 25. In the receiving institution's IQA process, the received image is evaluated against industry parameters using the receiving institutions pass/fail guidelines (block 212). The IQA evaluation produces a systematic scoring of the image based on industry image tests.

If the image passes the IQA test (block 213) it is passed to the receiving institution's posting process flow module 12 (block 211). If the image fails the IQA image test (block 213), it is passed to the failed image review flow module (block 214). Failed images are flagged as being suspect quality and may be manually reviewed in the failed image review flow. Not all institutions perform the manual review. These institutions deem all suspect items that fail the automated review as failures. If the manual review is performed some of the suspect images will be deemed of sufficient quality and these images are eligible to pass to the posting process flow module 12 (block 215). Because the IQA test is based on image attributes, a certain percentage of failed images will result in false failures. These false failures can result from item skew, a signature overlapping into the MICR printing, torn corners, dark areas etc. While these problems may result in a failed test result they do not affect the ability of the institution to pay the item and present a valid image to the institution's customer. These items are passed to the posting process flow module 12 upon manual confirmation of image quality (block 215). Items are only allowed to pass into the posting process flow if they include images that have been determined to be of sufficient quality based on either the automated IQA test or the secondary manual review. Any image that fails this review is not allowed to pass to the posting process flow module 12.

Images that are determined to be of insufficient quality and fail the review are routed from the manual review to the administrative returns and exceptions flow module 14 of the institution where the item may be returned to the presenting institution 7 (block 216). The administrative returns and exceptions flow module 14 is responsible for returning the item back to the presenting institution. In response to a return the presenting institution may either re-present a different image or present the actual paper check.

Some items, even though they were legally presented for current day processing (block 207), cannot be processed in time to complete posting prior to the current day posting deadline. A determination is made for each item that includes an image that is deemed of acceptable quality whether or not it can be posted on the current day (block 217). For items processed prior to the current day posting deadline, the items are passed to the receiving institution's posting process flow module 12 where the item is posted to the appropriate customer account (block 218). Once passed to this process the item will be posted with the current day postings.

For items that are not processed prior to the current day posting deadline, the items are passed to holdover flow module 26 where the item is held for "next day" processing (block 218). Holdover flow module 26 includes the general ledger accounting of items that have been legally presented to the institution but have not completed processing through the posting process at the receiving institution. Items that are routed to holdover flow module 26 include all required components for posting including data and an image of acceptable quality. These items are booked to a work in progress account and are passed to the institution's posting process with a posting date of "next day" where they will be posted with the next day's postings. Appropriate general ledger entries are booked with the correct processing day to balance the transaction out and maintain standard work-in-process accounting practices.

For data files that are received that have no image, such as an ECP file, (block 202), the files are logged into the system (block 203) but no further processing is permitted because no image was presented with the data (block 204). When a related image file, such as an ECPi file corresponding to an ECP file, is subsequently received, the image file is reconciled with the previously received data file (block 203) and a combined file having the data and image is routed through the system as previously described.

Using the image posting system of the invention the institution can prevent the posting of transactions of questionable quality or improper transactions. Specific embodiments of an invention are disclosed herein. One of ordinary skill in the computing and financial arts will quickly recognize that the invention has other applications in other environments. Many embodiments are possible. The following claims are in no way intended to limit the scope of the invention to the specific embodiments described above.

What is claimed is:

1. An image document processing method performed by a processor, the method comprising:
   receiving an electronic image of a document sent from a sending institution to a receiving institution;
   determining whether an image quality analysis was already conducted on the electronic image by the sending institution or by an institution that had the image prior to the receiving institution;
   if it is determined that the sending institution or the institution that had the image prior to the receiving institution already conducted an image quality analysis, reviewing the results of the image quality analysis and determining whether the results are acceptable; and
   if it is determined that an image quality analysis was not already conducted by the sending institution or an institution that had the image prior to the receiving institution, performing an image quality analysis on the electronic image.

2. The method of claim 1 further comprising:
   receiving an electronic file, said file containing data; and
   determining whether the electronic file contains the electronic image.

3. The method of claim 2 further comprising:
   determining that the electronic file contains non-image data but does not contain the electronic image;
   storing the non-image data in an image-pending datastore until the electronic image is received at some later time; and
   associating the non-image data with the electronic image after both the non-image data and electronic image are received.

4. The method of claim 2 further comprising logging the electronic file into a received file log.

5. The method of claim 1 wherein the step of receiving the electronic image comprises:
   receiving a non-image data file, said non-image data file logged into a received file log; and
   receiving the electronic image after said non-image data file, and associating said image with said non-image data file.

6. The method of claim 1 further comprising determining if the received electronic image has been received in accordance with an agreement with the sending institution.

7. The method of claim 1 further comprising identifying the electronic image for either next day processing or same day processing.

8. The method of claim 1 further comprising:
   posting the electronic image to an account.

9. The method of claim 8 further comprising:
   determining if there is sufficient time to post the electronic image to the account; and posting the electronic image only if it is determined that there is sufficient time.

10. The method of claim 8 further comprising:
determining if there is sufficient time to complete the posting of the electronic image to the account; and
holding the posting until the next day if it is determined that there is not sufficient time to complete the posting.

11. The method of claim 10 further comprising booking a work-in-process general ledger entries of the transaction.

12. The method of claim 1, further comprising:
performing a manual image quality analysis if the electronic image fails the automated image quality analysis;
passing the electronic image for further processing only if the electronic image passes the automated image quality analysis or the manual image quality analysis; and
returning the electronic image to the sending institution if the electronic image fails the manual image quality analysis.

13. The method of claim 1, wherein the document comprises a negotiable instrument.

14. The method of claim 13, wherein the document comprises a check.

15. The method of claim 1, wherein the sending institution and the receiving institution comprise financial institutions.

16. The method of claim 1, wherein the receiving institution comprises a payor bank.

17. The method of claim 1, wherein the method is performed by a payor bank.

18. An image document processing apparatus comprising:
means for receiving a file;
means for determining if the file is eligible for further processing by determining if an image or non-image data is contained in the file;
means for storing the non-image data in an image-pending datastore if there is no image in the file;
means for matching an image with non-image data;
means for determining whether an image quality analysis was already conducted on the image by the sending institution;
means for reviewing the results of the image quality analysis and for generating a pass or fail result, if it is determined that the sending institution already conducted an image quality analysis on the image;
means for performing an image quality analysis on the image and for generating a pass or fail result, if it is determined that an image quality analysis was not already conducted on the image by the sending institution; and
means for processing the file and image if the pass result is generated.

19. An image document processing method performed by a processor, the method comprising:
receiving a file,
determining if said file includes an image of a check, non-image data, or both;
if the file contains the non-image data and does not contain the image, storing the non-image data in an image-pending datastore until the image is received at some later time;
if the file contains an image, determining whether an image quality analysis was already performed on the image by another institution;
if it is determined that another institution already performed an image quality analysis on the image, reviewing the results of the image quality analysis;
if it is determined that an image quality analysis was not already performed by another institution, performing an image quality analysis on the image; and
passing the file and image of the check for posting to an account if the image passes the image quality analysis.

20. An image document processing method performed by a processor, the method comprising:
receiving a file containing an electronic image of a document, non-image data, or both;
if the file contains only non-image data and no image, storing the non-image data in an image-pending datastore until the image is received at some later time;
determining if an image quality analysis was conducted by another institution;
if it is determined that another institution already performed an image quality analysis on the image, reviewing the results of the image quality analysis;
if it is determined that an image quality analysis was not already conducted by another institution, performing an image quality analysis on the image;
passing the file and image for further processing if the image passes the image quality analysis; and
using agreement criteria based on agreements between a payor bank and a receiving bank or other presenting bank to automatically determine if there is sufficient time to complete the posting of the image to the account and holding the posting until the next day if there is not sufficient time to complete the posting.

21. An image document processing method performed by a processor, the method comprising:
receiving a file;
determining if the file is an image file containing an image, a data file containing no image, or a combination file containing an image and non-image data;
if it is determined that the file is a data file that does not contain an image, acknowledging the data file without performing an image quality analysis;
if it is determined that the file is an image file that contains an image, determining if an image quality analysis was conducted on the image by another institution;
if an image quality analysis was not conducted by another institution, performing an image quality analysis on the image associated with the image file;
if an image quality analysis was already conducted on the image associated with the image file by another institution, reviewing the results of the image quality analysis;
associating the image file to a previously received data file;
if it is determined that the file is a combination file containing an image and non-image data, determining if an image quality analysis was conducted on the image by another institution;
if it is determined that an image quality analysis was not conducted by another institution, performing an image quality analysis on the image associated with the combination file
if it is determined that an image quality analysis was already conducted on the image associated with the combination file by another institution, reviewing the results of the image quality analysis; and
passing the image for further processing if the image passes the image quality analysis.

* * * * *

UNITED STATES PATENT AND TRADEMARK OFFICE
CERTIFICATE OF CORRECTION

PATENT NO. : 7,630,518 B2 Page 1 of 1
APPLICATION NO. : 11/161475
DATED : December 8, 2009
INVENTOR(S) : Frew et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 389 days.

Signed and Sealed this

Second Day of November, 2010

David J. Kappos
*Director of the United States Patent and Trademark Office*